US012584852B2

(12) United States Patent
Darwin et al.

(10) Patent No.: US 12,584,852 B2
(45) Date of Patent: Mar. 24, 2026

(54) SYSTEMS AND METHODS FOR CONCURRENT MEASUREMENTS OF INTERFEROMETRIC AND ELLIPSOMETRIC SIGNALS OF MULTI-LAYER THIN FILMS

(71) Applicant: Nanoverse Technologies, LTD., Beaverton, OR (US)

(72) Inventors: Michael J. Darwin, Portland, OR (US); Randy James, Aledo, TX (US)

(73) Assignee: NANOVERSE TECHNOLOGIES, LTD., Beaverton, OR (US)

( * ) Notice: Subject to any disclaimer, the term of this patent is extended or adjusted under 35 U.S.C. 154(b) by 718 days.

(21) Appl. No.: 17/934,859

(22) Filed: Sep. 23, 2022

(65) Prior Publication Data

US 2023/0098439 A1    Mar. 30, 2023

Related U.S. Application Data

(60) Provisional application No. 63/261,540, filed on Sep. 23, 2021.

(51) Int. Cl.
| | |
|---|---|
| *G01N 21/21* | (2006.01) |
| *G01B 9/02* | (2022.01) |
| *G02B 27/28* | (2006.01) |

(52) U.S. Cl.
CPC ....... *G01N 21/211* (2013.01); *G01B 9/02043* (2013.01); *G02B 27/283* (2013.01); *G01B 2290/45* (2013.01); *G01B 2290/70* (2013.01)

(58) Field of Classification Search
CPC ......... G01N 21/211; G01N 2021/8438; G01N 21/45; G01B 9/02043; G01B 2290/45; G01B 2290/70; G01B 9/02027; G01B 11/0641; G02B 27/283
See application file for complete search history.

(56) References Cited

U.S. PATENT DOCUMENTS

| | | | |
|---|---|---|---|
| 7,616,323 B2 * | 11/2009 | De Lega ............ | G01B 9/02043 356/497 |
| 2004/0080757 A1 * | 4/2004 | Stanke ............... | G01N 21/9501 356/601 |
| 2004/0227951 A1 * | 11/2004 | Hill .................... | G01B 9/02007 356/450 |

(Continued)

OTHER PUBLICATIONS

Guo, T. et al., "Film thickness measurement based on nonlinear phase analysis using a Linnik microscopic white-light spectral interferometer," Applied Optics, vol. 57, No. 12, Apr. 2018, 7 pages.

*Primary Examiner* — Hwa Andrew Lee
(74) *Attorney, Agent, or Firm* — McCoy Russell LLP

(57) ABSTRACT

A system may include a broadband light source emitting polarized light that is polarized to two orthogonal polarization states, multiple beam splitters for combining and splitting the polarization states, and interferometric cell for creation of interference patterns with respect to a sample surface, lenses of appropriate design that focus the polarized light at predefined locations, and sensors that analyze the polarized light as a function of angle and wavelength. The system may also include a controller configured to modulate the reference arm through operation of an optical chopper and allow for different data analysis modes to be used on the system produced data.

9 Claims, 10 Drawing Sheets

(56) References Cited

U.S. PATENT DOCUMENTS

| | | | |
|---|---|---|---|
| 2008/0049233 A1* | 2/2008 | De Groot | G01B 9/02044 |
| | | | 356/511 |
| 2022/0390355 A1* | 12/2022 | Srocka | G01B 9/0207 |
| 2023/0035415 A1* | 2/2023 | Kamenev | G01B 11/0675 |

* cited by examiner

200

285

205

230

250

245

225

240

257

220

235

210

215

255

260

265

270

275

256

280

PRIOR ART

START

810

Pass light through polarizing device

820

Activate beam chopper rotation to eliminate interference of optical signals

830

Collect and analyze polarized optical signal at first camera

840

Collect and analyze ellipsometric signal at second camera

END

SYSTEMS AND METHODS FOR CONCURRENT MEASUREMENTS OF INTERFEROMETRIC AND ELLIPSOMETRIC SIGNALS OF MULTI-LAYER THIN FILMS

CROSS-REFERENCE TO RELATED APPLICATION

The present application claims priority to and the benefit of U.S. Provisional Patent Application No. 63/261,540, entitled "SYSTEMS AND METHODS FOR CONCURRENT MEASUREMENTS OF INTERFEROMETRIC AND ELLIPSOMETRIC SIGNALS OF MULTI-LAYER THIN FILMS", filed on Sep. 23, 2021. The entire contents of the above-listed application are hereby incorporated by reference for all purposes.

TECHNICAL FIELD

Embodiments of the disclosed technology are generally related to systems for measuring optical properties of samples through concurrent application of ellipsometry and interferometry.

BACKGROUND/SUMMARY

Certain conventional optical systems may utilize reflectometers, ellipsometers, or spectrometers to measure the optical properties of a thin film under investigation, e.g., film thickness, optical absorption, etc. Other optical systems may use interferometers or diffractometers to infer the material properties of the thin film. Many of these optical systems are considered non-destructive in nature, using light and a model to deduce the film thickness, topography, or other properties of the thin film.

In some cases, optical systems may utilize broadband light, for example white light, as part of the measurement approach, enabling measurements to be fit as a function of wavelength. Other approaches may use a single wavelength of light, which may simplify the modeling and the optical systems. In many cases, the conventional optical systems may use polarized light as a probe to the thin film under measure. Many of these approaches may modulate the phase of the probing light while measuring the phase shift induced by the interaction with the thin film.

Measurements of thin films is a common industrial practice in the manufacturing of semiconductors, displays, optics, etc. Conventional techniques are typically optical in nature due to the speed of measurement over contact techniques. However, several challenges exist for measuring the topography or film thickness of multi-layer, complex, thin films with optical techniques. Specifically, when the thin films are deposited over lithographically patterned features, these buried structures will modify the optical response from the sample, creating measurement challenges. Some traditional measurement techniques rely on repeated subsurface structure to match measurement to model. Others approaches use a sequential combination of techniques, which extends the applicability to isolated, non-repeating, substructures. Consequently, these approaches generally increase unwanted cost and time, while making the system design and modeling more complicated.

Additionally, traditional interferometric measurements typically do not utilize a physical model to interpret topographical features of the sample surface. Instead, said measurements are determined to be direct measurements, requiring a calibration process. In contrast, ellipsometric measurements are said to be indirect, or modeled results, requiring a regression or a model of the physical optical properties of the material (complex index of refraction) to extract film thickness, making integration of interferometric and ellipsometric data of complex thin films more cumbersome.

In one example, the issues described above may be addressed by an optical system for concurrent interferometry and ellipsometry, comprising a broadband light source configured to emit polarized light that is polarized to two orthogonal polarization states, a plurality of beam splitters configured to combine and split the polarized light that is polarized to the two orthogonal polarization states, an interferometric cell configured to create interference patterns with respect to a surface of a sample, a plurality of lenses configured to focus the polarized light at predefined locations, and a plurality of detectors configured to analyze the polarized light as a function of angle and wavelength. In particular, the disclosed technology generally provides systems and methods for concurrently measuring the wavelength dependent ellipsometric phase, which is the phase difference between s and p polarization states, and the interferometric phase which is the phase difference, of s or p polarization of states, between a sample and a reference surface. For samples that have complex thin films on their surface, the interferometric phase is modified by the optical properties of the thin films, no longer considered bulk in nature, being retarded or phase shifted by some amount due to interference from subsurface interfaces and/or modified by the material properties (specifically the conductivity or complex dispersion) of the complex films. Additionally, complex repeated structures on the sample surface may act like gratings, scattering light in a well-defined manner. By concurrently measuring the ellipsometric and the interferometric phases (along with any complex amplitude information), a more thorough optical characterization of the sample may be obtained.

By measuring both the relative phase of the s and p polarization states, and the phase shift induced in either s and/or p polarization states, a generalized model may be created to describe the optical response from the sample. By regressing on both the ellipsometric and interferometric properties jointly, either sequentially or concurrently, the number of floating variables without constraints may be reduced, producing reliable film thickness and topography results. In one example, the regression process may take place concurrently with obtaining the measurements. In another example, the regression process may take place prior to the actual measurement, and look up tables are subsequently used to identify the thin film properties. In other examples, a combination of look up tables and regression processes can be used to ascertain the desired thin film properties.

The measurement may take place over one or many wavelengths. Data across wavelengths may be combined to describe the optical properties of the sample. The data may be modeled by using the broadband optical response of the system and sample. The calibration of the system may be carried out by using samples of known optical and topographical properties. The wavelength response of the sample may be included in the model processes, or may be used as a float parameter.

By concurrently measuring the interferometric and ellipsometric signals of the thin film, the technical effect of achieving a more thorough optical characterization of the thin film may be efficiently obtained. Furthermore, concurrently measuring interferometric and ellipsometric signals of the thin film enables determination of film thickness properties and topography concurrently without mechanically moving the sample and/or adding/removing components from the optical system. Additionally, the disclosed technology may allow for the ability to measure complex multi-layer transparent film stack optical properties for fitting to a generalized model with few floating variables, allowing for a more simplified and accurate modeling process. Further still, the disclosed technology advantageously compensates for phase changes generated by reflections from sample surfaces, and facilitates a reliable solution for thin film characterization for high speed manufacturing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
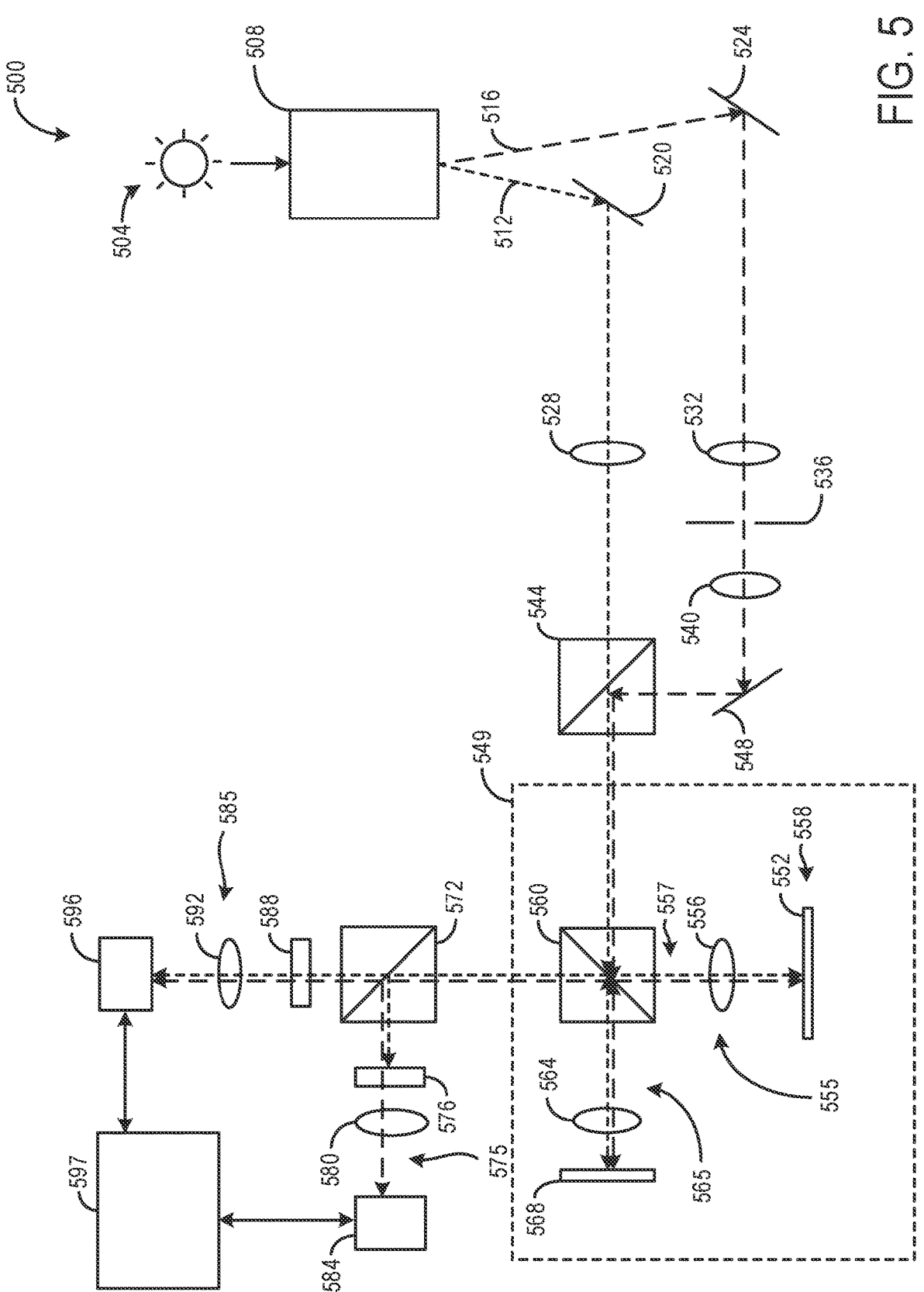
FIG. 5 illustrates a third example embodiment of a system for concurrent ellipsometry and interferometry, according to the present disclosure.
Figure 6:
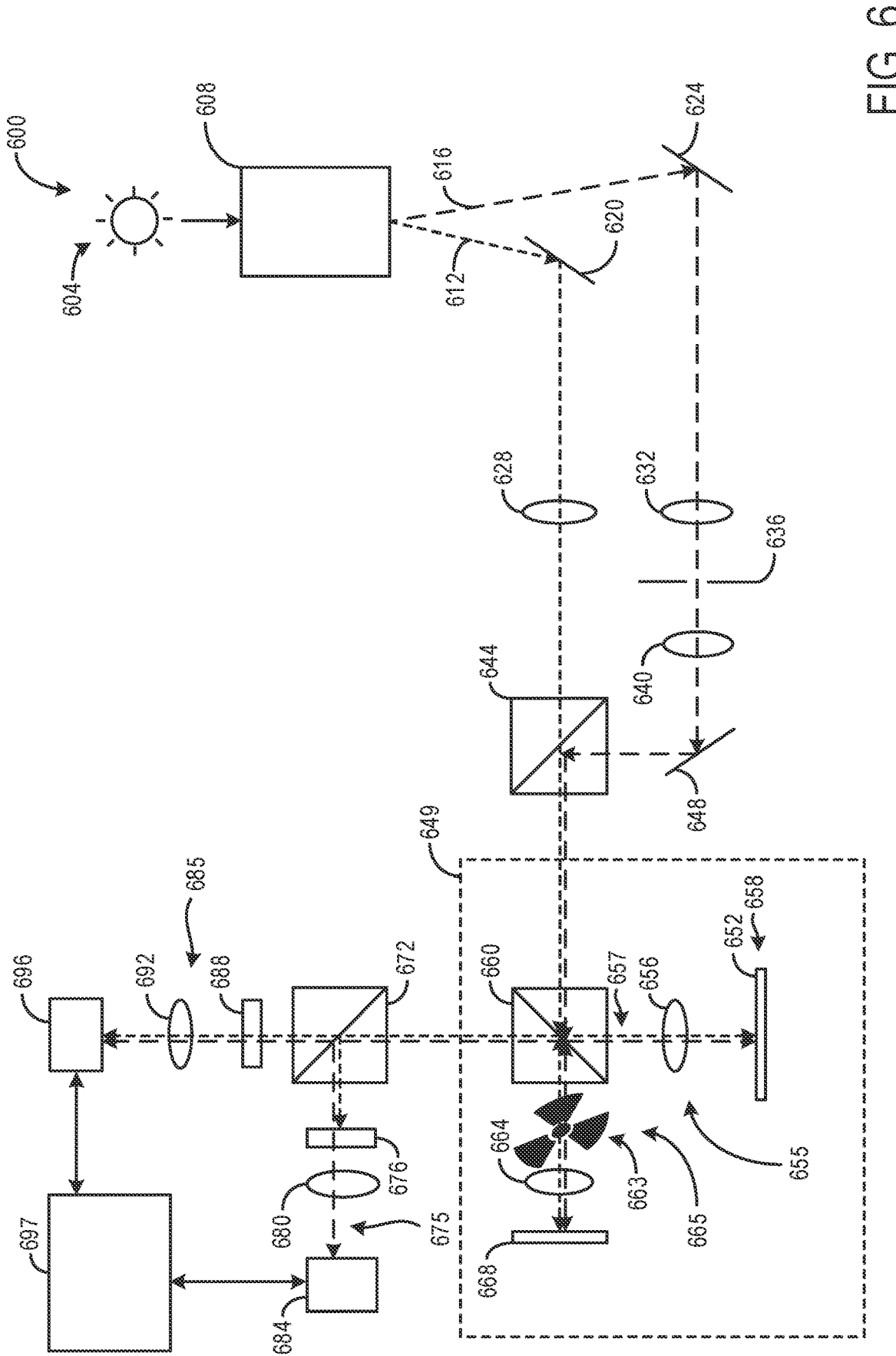
FIG. 6 illustrates a fourth example embodiment of a system for concurrent ellipsometry and interferometry, according to the present disclosure.

Implementations of the disclosed technology generally pertain to methods and apparatuses used for measuring the thin film properties of manufactured products. Various industries typically rely on thin film measurements to ensure quality control and sound manufacturing practices of a product and, in some cases, these thin film measurements are integrated into the process flow to ensure that unit level specifications are met for pre-assemblies or integration, for example. Typical properties to be measured of thin films are surface topography and film thickness. A standard way of measuring surface topography of a thin film (in addition to other optical properties) may be provided by an ellipsometer; a schematic example of an ellipsometer is provided in FIG. 1. Correspondingly, the thickness of a thin film may be measured through interferometry; a schematic example of a spectral interferometer of the Linnik type is provided in FIG. 2. Both interferometry and ellipsometry may be combined in a single optical system in which an interferometric signal may be obtained through measurement of signals received in a first detection arm of the system, and an ellipsometric signal may be obtained through measurement of signals received in a second detection arm of the system. In a first example, interferometric and ellipsometric signals may be separated out through a polarized beam splitter, and a signal obtained in the first detection arm may be an interferometric signal of Koehler illumination of one polarization, while the second signal obtained in the second detection arm may be an ellipsometric signal of a collimated beam of an orthogonal polarization; such an example embodiment of an optical system is provided in FIG. 3. Alternatively, an optical chopper may be provided in a reference arm of the optical system of FIG. 3, to allow for interruption of interference, to allow for a purely ellipsometric signal or a purely polarized optical microscope signal; such an example embodiment of an optical system is provided in FIG. 4. Further modifications to the optical system of FIG. 3 may include separating signals to be received in the first detection arm and the second detection arm by a non-polarizing beam splitter, while including a fixed polarizer in the first detection arm, and a rotating analyzer in the second detection arm. This may allow for further characterization of the ellipsometric signal through measuring the rotation of the polarization of the collimated beam. Such an optical system is shown in FIG. 5, and the system of FIG. 5 with an additional optical chopper in the reference arm is shown in FIG. 6. Accordingly, FIGS. 7-10 show flowcharts of example methods for operation of the optical systems of FIGS. 3-6, respectively.

Figure 1:
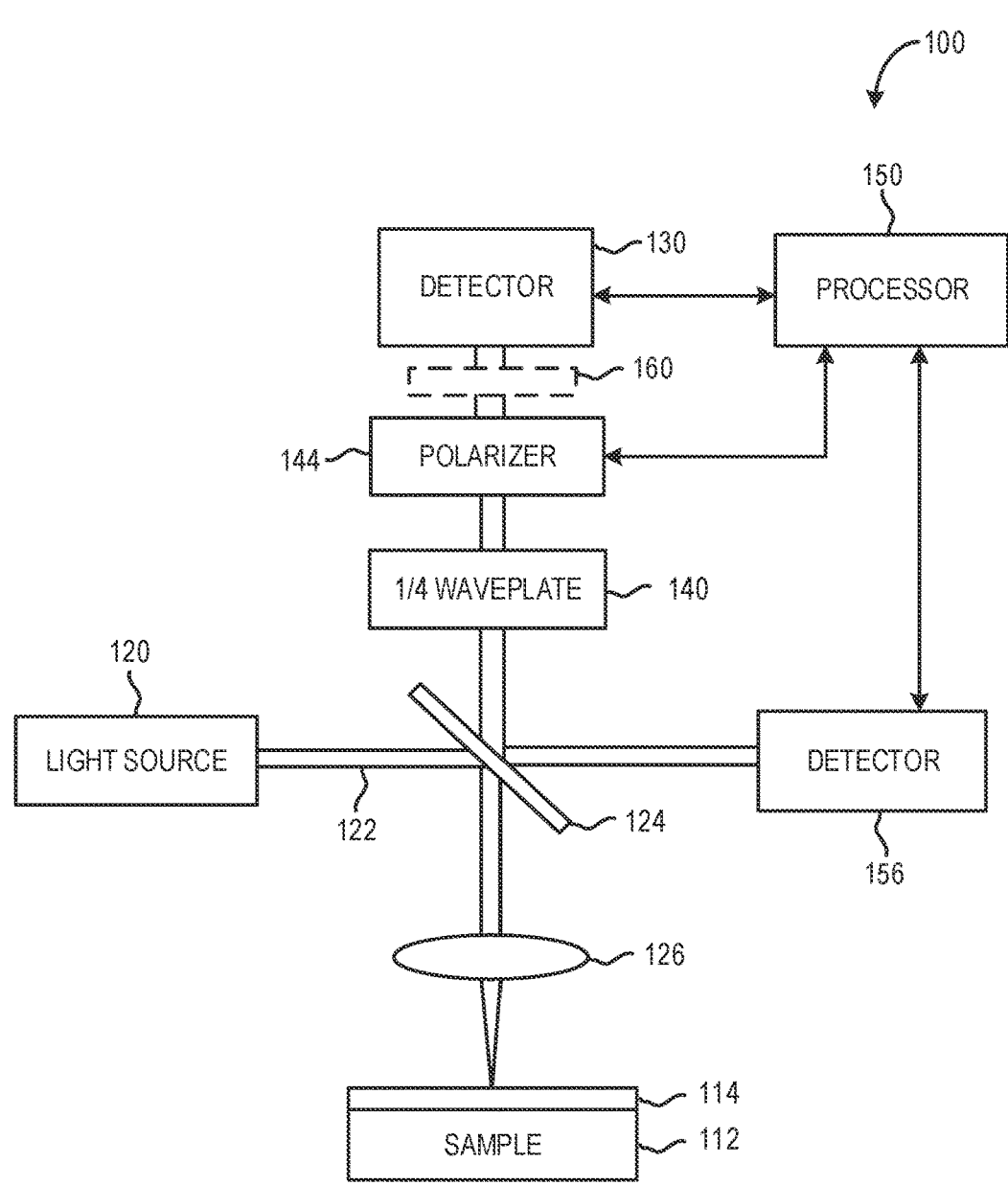
FIG. 1 illustrates a schematic example of an ellipsometer.

FIG. 1 illustrates an ellipsometer 100 following the design included in U.S. Pat. No. 11,269,204. Ellipsometer 100 is intended to be used to evaluate a sample 112 having one or more layers 114 formed thereon. Typically, layers 114 may be dielectric or metal layers.

Ellipsometer 100 includes a light source 120 for generating a probe beam 122. In one example, light source 120 may be a laser generating a stable narrow wavelength beam. Other variants for the light source will be discussed below. In another example, the output of light source 120 is polarized. Alternatively, a polarizer can be placed in the path of the beam to provide polarization control.

Probe beam 122 may be directed towards the sample, in this case, by beam splitter 124. The beam may be focused onto the sample with a focusing element 126. Focusing element 126 may have a relatively high numerical aperture (NA) to create a large spread of angles of incidence on the sample for measurement of an ellipsometric signal. In one example, focusing element 126 may have a NA of at least 0.5 and more preferably on the order of 0.9. A focusing element with an NA of 0.5 will create angles of incidence from zero to 30 degrees with respect to the normal. A 0.9 NA (or greater) will extend that range out to about 64 degrees (and beyond).

In one example, the focusing element 126 is a compound microscope objective. Focusing element 126 may include lenses, mirrors or a combination of both. In further examples, the probe beam is focused to a spot size on the order of 10 microns or less and in some cases more preferably on the order of about one micron in diameter.

Light reflected from the sample may be collected by the lens 126 and directed to a photodetector 130. Prior to reaching the photodetector 130, the probe beam 122 is passed through a compensator, in this case, quarter-wave plate 140 for retarding the phase of one of the polarization states of the beam. The quarter-wave plate may be located in the beam path prior to the probe beam striking the sample. The latter approach might have some advantages in reducing the aberrations created by lens 126. In a preferred embodiment, the compensator may induce a phase retardation of 90 degrees; however larger or smaller retardations are possible.

The beam may then be passed through a linear polarizer 144 which functions to cause the two polarization states of the beam to interfere with each other. In order to maximize the desired signal, the axis of the polarizer may be oriented at an angle of 45 degrees with respect to the fast and slow axes of the quarter-wave plate 140. There may be situations depending on sample conditions where the optimal orientation of the polarizer would be somewhere between 30 degrees and 60 degrees with respect to the fast and slow axes of the quarter-wave plate.

The photodetector 130 may be preferably comprised of a two-dimensional array of photodetector elements or pixels 132. Such an arrangement is typical in commercially available charge-coupled device (CCD) arrays. The output from the elements of the photodetector 130 may be supplied to a controller 150, which may contain a processing unit. Controller 150 may also control and monitor the position of quarter-wave plate 140 and in some cases linear polarizer 144.

As seen in FIG. 1, a portion of the probe beam 122 passes directly through beam splitter 124 to strike incident power detector 156. Incident power detector 156 may be provided to monitor fluctuations in the output power of the probe beam light source. The output of incident power detector 156 may also be supplied to the controller to provide normalization.

In some circumstances, it may be desirable to obtain measurements at more than one wavelength. If it is desired to measure with a very small spot size such that a laser light source is generates a coherent beam, light source 120 may comprise two or more lasers each having an output at different wavelengths. These lasers could be energized sequentially to produce data at different wavelengths. Alternatively, light source 120 may comprise a tunable laser.

Light source 120 may also be a white light source that would generate a polychromatic probe beam. A wavelength selective filter 160 (shown by a dashed box in FIG. 1) may then be placed somewhere in the light path between the light source and the detector. The filter could take the form of simple band pass (color) filters which are selectively moved into the path of the beam. Alternatively, a monochrometer could be used to sequentially select narrow wavelength regions.

Figure 2:
FIG. 2 illustrates a schematic example of a Linnik-type interferometer.

FIG. 2 shows a schematic example of a Linnik interferometer 200. The design of the Linnik interferometer 200 follows the design illustrated in Applied Optics, Vol. 57, No. 12, 20 Apr. 2018. Linnik interferometer 200 may be used to evaluate a sample 260. Sample 260 may for example include a thin film on top of a substrate, and Linnik interferometer 200 may be utilized in order to provide a measure of the thickness of sample 260.

Linnik interferometer 200 may include a light source 280. In the example embodiment given in FIG. 1, light source 280 may include be a white light source which may pass through a fiber optical cable. In a preferred embodiment, light source 280 may be a halogen lamp, which may produce a collimated beam of white light after passing light through lens 275.

Collimated white light projected from lens 275 may then pass through a first beam splitter 235, splitting into two beams of collimated white light, with a first beam entering a first objective 240 of a reference arm 257 of the Linnik interferometer 200, and a second beam entering a second objective 255 of a measurement arm 256 of the Linnik interferometer 200 in a reference arm 257 of the Linnik interferometer 200. Preferably, the first objective 240 of the reference arm 257 and the second objective 255 of the measurement arm 256 have common optical properties (e.g., matched numerical apertures). The first objective 240 may serve to focus incident collimated light from the first beam splitter 235 on to a reference mirror 245. The distance between the first beam splitter 235 and the reference mirror 245 may be adjusted via a mechanical actuator 250, which may be controlled by controller 285. In one example, the mechanical actuator 250 may be a piezo device made of lead zirconate titanate, or PZT.

The second beam of light from the first beam splitter 235 may enter into the second objective 255 of the measurement arm 256 and may be focused onto a sample 260 mounted on a stage 265. The stage may be coupled to a stepping motor 270, which may allow for optional mechanical manipulation of the position of the sample 260 in the plane of the sample 260, allowing for imaging of the sample thickness along different points on the sample 260.

Measurement light scattered and/or diffracted from sample 260 may pass through the second objective 255 to be transmitted through the first beam splitter 235 and received at a second beam splitter 220. Similarly, reference light reflecting off of reference mirror 245 may pass through the first objective 240 to be reflected by the first beam splitter 235 and received at the second beam splitter 220. The light from the sample 260 and the light from the reference mirror 245 may then interfere at the second beam splitter 220, producing an interference signal. A portion of the interference signal may then be collected at a focus lens 215 and obtained at an optical fiber spectrometer 205 via the optical fiber 210; the portion of the interference signal obtained at the optical fiber spectrometer 205 may then be transmitted to controller 285 after A/D conversion. Additionally, the other portion of the interference signal may optionally be collected at a tube lens 225 and imaged using a charge-coupled device (CCD) camera 230, allowing for imaging of the intensity profile of the interference signal.

The mechanical actuator 250 may be operated to manipulate the reference mirror 245 in a closed-loop manner. In one example, the mechanical actuator 250 may be operated in a closed-loop manner by the controller 285 to actuate the reference mirror 245 to maintain a null condition of the received signal at the CCD camera 230. In another example, the mechanical actuator 250 may be operated in a closed-loop manner in order to maintain focus of the interference signal received at the optical fiber spectrometer 205.

There is a phase difference between the measuring light and the reference light that directly determines the white-light spectral interferometric signal. After processing the interferometric signal obtained at the optical fiber spectrometer 205, the white-light spectral interferometric signal can be expressed as a function of the phase difference between the measuring light and the reference light, for each wavelength. Further analysis of the white-light interferometric signal may then be implemented in order to correct phase errors for example due to a mismatch in the optical properties of the first objective 240 and the second objective 255, and further phase errors due to homogeneities in the first beam splitter 235, for more precise film thickness measurement.

Figure 3:
FIG. 3 illustrates a first example embodiment of a system for concurrent ellipsometry and interferometry, according to the present disclosure.

FIG. 3 illustrates a first example embodiment of an optical system 300 for concurrent interferometry and ellipsometry of a sample 352. The sample 352 may include a thin film, for example a multi-layer thin film deposited over lithographically pattered features. In the optical system 300, interference signals may be obtained from imaging the sample 352 with Koehler illumination of a first polarization as a function of wavelength, while ellipsometric signals may be obtained from imaging a collimated light signal as a function of wavelength and angular position within a pupil plane 357.

Optical system 300 may include a light source 304 producing broadband light. Light source 304 for example may be a halogen lamp, which may produce a white light spectrum. Light from light source 304 may then pass through a polarizing device 308, which may generate a first beam 312 of a first polarization, and a second beam 316 of a second polarization that is orthogonal to the first polarization. The polarizing device 308 may for example be an opto-acoustic polarizing device, or a polarizing beam splitter.

The two beams of orthogonal polarization may then travel through two separate optical arms of the optical system 300. The first beam 312 may reflect off of a first mirror 320, to pass through a first lens 328, producing a collimated or near collimated beam of light. The second beam 316 may reflect off of a second mirror 324, pass through a second lens 332, an aperture 336, and a third lens 340, where the lenses 332, 340 are of an appropriate design for generating Koehler illumination. Koehler illumination is achieved when an image of the light source 304 is defocused in a focal plane 358 coinciding with a plane of the sample 352, providing uniform illumination of the sample. In one example, the first beam 312 may have a p-polarization with respect to the plane of incidence of the sample 352, while the second beam 316 may have an s-polarization with respect to the plane of incidence of the sample 352. The aperture 336 is positioned between the lenses 332, 340 and in relation to a fourth lens 356 in order to maintain a proper distance from the back focal length of the fourth lens 356. Hence, the first beam 312 may be maintained as a collimated beam in a p-polarization state, while the second beam 316 may be maintained as Koehler illumination in an s-polarization state.

The second beam 316 may then reflect off of a third mirror 348, and the beams 312, 316 may then be recombined and made coaxial at a first polarizing beam splitter 344, with the first beam 312 transmitting through the first polarizing beam splitter 344, while the second beam 316 may reflect off of the first polarizing beam splitter 344.

The beams 312, 316, made coaxial at the first polarizing beam splitter 344 may then be sent to an interferometric cell 349. The interferometric cell 349 in this embodiment is of a Linnik type, in which a measurement arm 355 includes a fourth lens 356, wherein the fourth lens 356 is maintained between the non-polarizing beam splitter 360 and the sample 352, and a reference arm 365 includes a fifth lens 364, wherein the fifth lens 364 is maintained between the non-polarizing beam splitter 360 and a flat mirror 368. The measurement arm 355 and the reference arm 365 may be configured to maintain the same optical path length in the absence of the sample 352, in order to allow for interference patterns to be generated at the non-polarizing beam splitter 360, due to the presence of a sample 352 introducing small differences in the optical path lengths of the measurement arm 355 and the reference arm 365. The lenses 356, 364 may be objective lens. Objective lenses may be chosen with appropriate NA values which enhance the ellipsometric signal. Further, larger NA values enable analysis of angular information. Preferably, the fourth lens 356 of the measurement arm 355 and the fifth lens 364 of the reference arm 365 have common optical properties (e.g., matched NAs).

The interferometric cell 349 may be configured to receive beams 312, 316, which may then each reflect and transmit through a non-polarizing beam splitter 360. Each of the two beams 312, 316 may transmit through the non-polarizing beam splitter 360 with first level of transmission through the reference arm 365, and may reflect off of the non-polarizing beam splitter 360 with a second level of reflection through the measurement arm 355. In one example, a 50/50 beam splitter may be chosen to balance the transmission and reflection optical power; however other beam splitting ratios may be chosen with consideration to samples under measure. In the reference arm 365, the beams 312, 316 may pass through the fifth lens 364, reflect off of the flat mirror 368, and return to the non-polarizing beam splitter 360. The surface of the flat mirror 368 may characterized to be within a pre-calibrated tolerance for surface flatness. In the measurement arm 355, the beams 312, 316 may transmit through the fourth lens 356, which focuses the collimated light of the first beam 312 to a spot onto the sample 352, and scatter and/or reflect from the sample 352. In one example, the size of the spot of the first beam 312 on the sample may be at the diffraction limit of the fourth lens 356. The interaction of the beams 312, 316 with the sample 352 may change the polarization of each of the first beam 312 and the second beam 316 from linear polarization to elliptical polarization, with the amount of polarization change being dependent on the optical properties of the sample 352 and the angle of incidence of each beam with respect to the sample 352. The beams 312, 316 in the reference arm 365 reflecting off the flat mirror 368 and the beams 312, 316 which scatter and/or reflect from the sample 352 in the measurement arm 355 may then interfere with like polarization states at the non-polarizing beam splitter 360.

The interfered beams 312, 316 may then further transmit through the non-polarizing beam splitter 360 and impinge upon a second polarizing beam splitter 372. Light of s-polarization may then be reflected by the second polarizing beam splitter 372 into a first detection arm 375, the first detection arm 375 including a sixth lens 376 and a first sensor 380. The first detection arm 375 may receive mostly Koehler illumination with a small fraction of the collimated beam which may have been rotated in an s-polarization due to interaction with the sample 352. The light reflected from the second polarizing beam splitter 372 may then collected at the sixth lens 376, and transmitted to the first sensor 380. Light of p-polarization may then be transmitted through the second polarizing beam splitter 372 into a second detection arm 385, the second detection arm 385 including a seventh lens 384 and a second sensor 388. The second detection arm 385 may receive mostly the collimated light from the first beam 312 with a fraction of the Koehler illumination from the second beam 316 which may have been rotated into a p-polarization due to interaction with the sample 352. The light transmitted through the second polarizing beam splitter 372 may then be collected at the seventh lens 384, and transmitted to the second sensor 388. Sensors 380, 388 may be for example CCD cameras, and may then transmit the signals received to a controller 397, which may contain a processing unit.

The light signal obtained at the first sensor 380 may be the interferometric signal from interference of s-polarized light at the non-polarizing beam splitter 360, whereby the sixth lens 376 may collect and focus Koehler illumination from the sample 352. Modulation of the interference signal received at the first sensor 380 may be obtained through scanning of the wavelength of the light signal received at the first sensor 380. While a fraction of the interferometric signal received at the first sensor 380 may be due to the collimated beam, the contribution from the collimated beam may produce a background signal or intensity shift, thereby reducing the fringe contrast in the interference signal. The end result is that the Koehler illumination and the interference thereof, and not collimated illumination, will be in focus at the first sensor 380.

The light signal obtained at the second sensor 388 may be an ellipsometric signal imprinted with an interferogram, whereby the seventh lens 384 may collect and focus collimated light from the pupil plane 357. Modulation of the ellipsometric signal received at the second sensor 388 may be obtained through scanning of the wavelength of the light signal received at the second sensor 388. The ellipsometric signal may measure a wavelength dependent ellipsometric phase, which is a phase difference between the p-polarized light and s-polarized light generated due to interaction of light with the sample 352. While a fraction of the ellipsometric signal received at the second sensor 388 may be due to Koehler illumination, the contribution of the Koehler illumination may produce as a background signal or intensity shift in the ellipsometric signal. The end result is that the collimated illuminated light and the interference thereof, and not Koehler illumination, will be in focus at the second sensor 388.

The interferometric and ellipsometric signals received at the first sensor 380 and the second sensor 388, respectively may then be analyzed with the processing unit of controller 397 and fit to a generalized model via regression to describe the optical response of the sample 352. The interferometric signal of the Koehler illuminated first polarization and the ellipsometric signal of the collimated illuminated second orthogonal polarization may be regressed on either sequentially or concurrently, and the regression process may take place concurrently with the measurements. Alternatively, the regression process may take place prior to the actual measurement and look up tables may be subsequently used to identify properties. A combination of look up tables and regression process can be used to ascertain the desired properties of sample 352.

Figure 4:
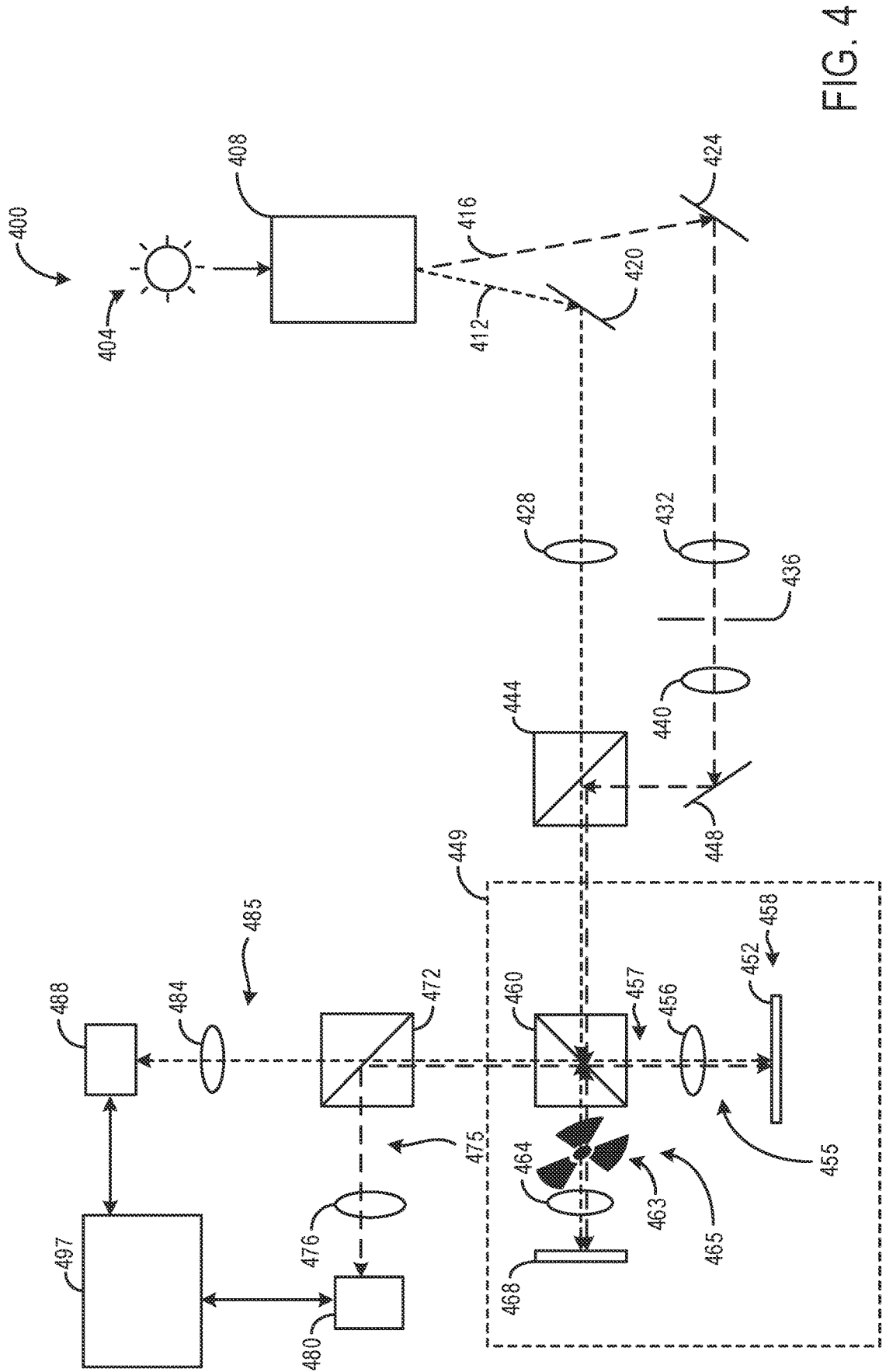
FIG. 4 illustrates a second example embodiment of a system for concurrent ellipsometry and interferometry, according to the present disclosure.

FIG. 4 illustrates a second example embodiment of an optical system 400 for concurrent polarized, multi-wavelength microscopy and ellipsometry of a sample 452. The sample 452 may include a thin film, for example a multilayer thin film deposited over lithographically pattered features. In the optical system 400, polarized optical signals may be obtained from imaging the sample 452 with Koehler illumination of a first polarization as a function of wavelength, while ellipsometric signals may be obtained from imaging a collimated light signal of a second polarization as a function of wavelength and angular position within a pupil plane 457.

Optical system 400 may include a light source 404 producing broadband light. Light source 304 for example may be a halogen lamp, which may produce a white light spectrum. Light from light source 404 may then pass through a wavelength selecting polarizing device 408, which may generate two beams of orthogonal polarization. The wavelength selecting polarizing device 408 may for example be an opto-acoustic polarizing device, or a polarizing spectrometer.

The two beams of orthogonal polarization may then travel through two separate optical arms of the optical system 400. The first beam 412 may reflect off of a first mirror 402, to pass through a first lens 428, producing a collimated or near collimated beam of light. The second beam 416 may reflect off of a second mirror 424, pass through a second lens 432, an aperture 436, and a third lens 440, where the lenses 432, 440 are of an appropriate design for generating Koehler illumination. In one example, the first beam 412 may have a p-polarization with respect to the plane of incidence of the sample 452, while the second beam 416 may have an s-polarization with respect to the plane of incidence of the sample 452. The aperture 436 may be positioned between the lenses 432, 440 and in relation to a fourth lens 456 in order to maintain a proper distance from the back focal length of the fourth lens 456. Hence, the first beam 412 may be maintained as a collimated beam in a p-polarization state, while the second beam 416 may be maintained as Koehler illumination in an s-polarization state.

The second beam 416 may then reflect off of a third mirror 448, and the beams 412, 416 may then be recombined and made coaxial at a first polarizing beam splitter 444, with the first beam 412 transmitting through the first polarizing beam splitter 444, while the second beam 416 may reflect off of the first polarizing beam splitter 444.

The beams 412, 416, made coaxial at the first polarizing beam splitter 444, may then be sent to an interferometric cell 449. The interferometric cell 449 in this embodiment is of a Linnik type, in which a measurement arm 455 includes a fourth lens 456, wherein the fourth lens 456 is maintained between the non-polarizing beam splitter 460 and the sample 452, and a reference arm 465 includes a fifth lens 464, wherein the fifth lens 464 is maintained between the non-polarizing beam splitter 460 and a flat mirror 468. The measurement arm 455 and the reference arm 465 may be configured to maximize the interference pattern generated at the non-polarizing beam splitter 460 due to the presence of a sample 452. However, in contrast to the optical system 300 of FIG. 3, the optical system 400 may contain an optical chopper 463 in the reference arm 465, positioned in between a non-polarizing beam splitter 460 and the fifth lens 464. The optical chopper 463 may spin at a fixed frequency, and may serve to periodically interrupt the beams 412, 416 in the measurement arm 455, serving to eliminate interference between light in the measurement arm 455 and light in the reference arm 465. The lenses 456, 464 may be objective lenses. Objectives may be chosen with appropriate NA values which enhance the ellipsometric signal. Further, larger NA values enable analysis of angular information. Preferably, the fourth lens 456 of the measurement arm 455 and the fifth lens 464 of the reference arm 465 have common optical properties (e.g., matched NAs).

The interferometric cell 449 may be configured to receive beams 412, 416, which may then each reflect and transmit through a non-polarizing beam splitter 460. Each of the two beams 412, 416 may transmit through the non-polarizing beam splitter 460 with first level of transmission through the reference arm 465, and may reflect off of the non-polarizing beam splitter 460 with a second level of reflection through the measurement arm 455. In one example, a 50/50 beam splitter may be chosen to balance the transmission and reflection optical power; however other beam splitting ratios may be chosen with consideration to samples under measure. In the reference arm 465, the beams 412, 416 may pass through the fifth lens 464, reflect off of a flat mirror 468, and return to the non-polarizing beam splitter 460. The surface of the flat mirror 468 may characterized to be within a pre-calibrated tolerance for surface flatness. In the measurement arm 455, the beams 412, 416 may transmit through the fourth lens 456, which focuses the collimated light of the first beam 412 to a spot onto the sample 452, and scatter and/or reflect from the sample 452. In one example, the size of the spot of the first beam 412 on the sample 452 may be at the diffraction limit of the fourth lens 456. The interaction of the beams 412, 416 with the sample 452 may cause a change in the polarization of each of the first beam 412 and the second beam 416 from linear polarization to elliptical polarization with the amount of polarization change being dependent on the optical properties of the sample 452. The beams 412, 416 in the reference arm 465 reflecting off of the flat mirror 468 and the beams 412, 416 which scatter and/or reflect from the sample 452 in the measurement arm 455 may then recombine at the non-polarizing beam splitter 460.

The beams 412, 416 may then further transmit through the non-polarizing beam splitter 460 and impinge upon a second polarizing beam splitter 472. Light of s-polarization may then be reflected by the second polarizing beam splitter 472 into a first detection arm 475, the first detection arm 475 including a sixth lens 476 and a first sensor 480. The first detection arm 475 may receive mostly Koehler illumination with a small fraction of the collimated beam which may have been rotated in an s-polarization due to interaction with the sample 452. The light reflected from the second polarizing beam splitter 472 may then collected at the sixth lens 476, and transmitted to the first sensor 480. Light of p-polarization may then be transmitted through the second polarizing beam splitter 472 into a second detection arm 485, the second detection arm 485 including a seventh lens 484 and a second sensor 488. The second detection arm 485 may receive mostly the collimated light from the first beam 412 with a fraction of the Koehler illumination from the second beam 416 which may have been rotated into a p-polarization due to interaction with the sample 452. The light transmitted through the second polarizing beam splitter 472 may then be collected at a seventh lens 484, and transmitted to a second sensor 488. Sensors 480,488 may be for example CCD cameras, and may then transmit the signals received to a controller 497, which may contain a processing unit.

Due to the removal of interference by introduction of the optical chopper 463, the first detection arm 475 may function as a multi-wavelength polarizing microscope for s-polarized light, allowing imaging of the sample 452 at the first sensor 480 as a function of angle and wavelength. The sixth lens 476 may focus light obtained from the sample 452 at the focal plane 458. The wavelength dependence of the signal received at the first sensor 480 may be obtained through scanning of the wavelength of the polarizing device 408.

The light signal obtained at the second sensor 488 may be a pure ellipsometric signal, and the seventh lens 484 may collect light obtained from the pupil plane 457. Modulation of the ellipsometric signal received at the second sensor 388 may be obtained through scanning of the wavelength of the light from the polarizing device 408. The ellipsometric signal may measure a wavelength dependent ellipsometric phase, which is a phase difference between the p-polarized light and s-polarized light generated due to interaction of light with the sample 452. While a fraction of the ellipsometric signal received at the second sensor 488 may be due to Koehler illumination, it will not be focused at the second sensor 488 due to lens 484. Further, due to the removal of interference in the optical system 400 by the optical chopper 463, modelling of the ellipsometric signal received at the second sensor 488 may be simplified by not having to model the impact of the interference arm on the measurement results.

The optical and ellipsometric signals received at the first sensor 480 and the second sensor 488, respectively may then be analyzed with the processing unit of controller 497 and fit to a generalized model via regression to describe the optical properties of the sample 452. The optical signal and the ellipsometric signal may be regressed on either sequentially or concurrently, and the regression process may take place concurrently with the measurements. Alternatively, the regression process may take place prior to the actual measurement and look up tables may be subsequently used to identify properties. A combination of look up tables and regression process can be used to ascertain the desired properties of sample 452. Further, imaging capabilities of the optical system 400 may be enhanced through comparing optical signals received in the detection arms 475, 485 in the presence of interference (when the optical chopper 463 is deactivated) versus optical signals received in the detection arms 475, 485 in the absence of interference (when the optical chopper 463 is activated).

FIG. 5 illustrates a third example embodiment of an optical system 500 for concurrent interferometry and ellipsometry of a sample 552. The sample 552 may include a thin film, for example a multi-layer thin film deposited over lithographically pattered features. In the optical system 500, interference signals may be obtained from imaging the sample 552 with Koehler illumination of a first polarization as a function of wavelength, while ellipsometric signals may be obtained of a second polarization from imaging a collimated light signal of a second polarization as a function of wavelength and angular position within a pupil plane 557.

Optical system 500 may include a light source 504 producing broadband light. Light source 504 for example may be a halogen lamp, which may produce a white light spectrum. Light from light source 504 may then pass through a wavelength selecting polarizing device 508, which may generate two beams of orthogonal polarization. The wavelength selecting polarizing device 508 may for example be an opto-acoustic polarizing device, or a spectrometer.

The two beams of orthogonal polarization may then travel through two separate optical arms of the optical system 500. The first beam 512 may reflect off of a first mirror 502, to pass through a first lens 528, producing a collimated or near collimated beam of light. The second beam 516 may reflect off a second mirror 524, pass through a second lens 532, an aperture 536, and a third lens 540, where the lenses 532, 540 are of an appropriate design for generating Koehler illumination. In one example, the first beam 512 may have a p-polarization with respect to the plane of incidence of the sample 552, while the second beam 516 may have an s-polarization with respect to the plane of incidence of the sample 552. The aperture 536 is positioned between the lenses 532, 540 and in relation to a fourth lens 556 in order to maintain a proper distance from the back focal length of the fourth lens 556. Hence, the first beam 512 may be maintained as a collimated beam in a p-polarization state, while the second beam 516 may be maintained as Koehler illumination in an s-polarization state.

The second beam 516 may then reflect off a third mirror 548, and the beams 512, 516 may then be recombined and made coaxial at a polarizing beam splitter 544, with the first beam 512 transmitting through the polarizing beam splitter 544, while the second beam 516 may reflect off of the polarizing beam splitter 544.

The beams 512, 516, having been made coaxial via the polarizing beam splitter 544, may then be sent to an interferometric cell 549. The interferometric cell 549 in this embodiment is of a Linnik type, in which a measurement arm 555 includes a fourth lens 556, wherein the fourth lens 556 is maintained between a first non-polarizing beam splitter 560 and the sample 552, and a reference arm 565 includes a fifth lens 564, wherein the fifth lens 564 is maintained between the first non-polarizing beam splitter 560 and a flat mirror 568. The measurement arm 555 and the reference arm 565 may be configured maximize the interference patterns to be generated at the first non-polarizing beam splitter 560, due to the presence of a sample 552. The lenses 556, 564 may be objective lens, and may have a NA chosen to enhance the ellipsometric signal. Preferably, the fourth lens 556 of the measurement arm 555 and the fifth lens 564 of the reference arm 565 have common optical properties (e.g., matched NAs).

The interferometric cell 549 may be configured to receive beams 512, 516, which may then each reflect and transmit through the first non-polarizing beam splitter 560. Each of the two beams 512, 516 may transmit through the first non-polarizing beam splitter 560 with first level of transmission through the reference arm 565, and may reflect off of the first non-polarizing beam splitter 560 with a second level of reflection through the measurement arm 555. A 50/50 beam splitter may be chosen to balance the optical power between the two arms of the interferometer cell, however other combinations may be chosen to include characteristics of the sample. In the reference arm 565, the beams 512, 516 may pass through the fifth lens 564, reflect off of a flat mirror 568, and return to the first non-polarizing beam splitter 560. The surface of the flat mirror 568 may characterized to be within a pre-calibrated tolerance for flatness. In the measurement arm 555, the beams 512, 516 may transmit through the fourth lens 556, which focuses the collimated light of the first beam 512 to a spot onto the sample 552, and scatter and/or reflect from the sample 552. In one example, the size of the spot of the first beam 512 on the sample 552 may be at the diffraction limit of the fourth lens 556. The interaction of the beams 512, 516 with the sample 552 may cause change in the polarization of each of the first beam 512 and the second beam 516 from a linear polarization, with the amount of polarization change being dependent on the optical properties of the sample 552. The beams 512, 516 in the reference arm 565 reflecting off of the flat mirror 568 and the beams 512, 516 which scatter and/or reflect from the sample 552 in the measurement arm 555 may then interfere with like polarization states at the first non-polarizing beam splitter 560.

The beams 512, 516, having interfered at the first non-polarizing beam splitter 560, may then further transmit through the first non-polarizing beam splitter 560 and impinge upon a second non-polarizing beam splitter 572. Light may then be reflected by the second non-polarizing beam splitter 572 into a first detection arm 575, the first detection arm 575 including a sixth lens 580 and a first sensor 584. In contrast with the optical systems 300, 400 of FIGS. 3-4 respectively, the first detection arm 575 may optionally include a fixed polarizer 576 positioned in between the second non-polarizing beam splitter 572 and the sixth lens 580 in order to filter out p-polarized light; the light passing through the fixed polarizer 576 may then include mostly Koehler illumination with a small fraction of the collimated beam. The Koehler illumination filtered through the fixed polarizer 576 may then be focused by the sixth lens 580, and transmitted to the first sensor 584; collimated light that passes through lens 580 will not be focused at the first sensor 584. Light may also be transmitted through the second non-polarizing beam splitter 572 into a second detection arm 585, the second detection arm including a seventh lens 592 and a second sensor 596. In contrast with the optical systems 300, 400 of FIGS. 3-4 respectively, the second detection arm 585 may include a rotating polarizer 588 positioned in between the second non-polarizing beam splitter 572 and the seventh lens 592. The rotating polarizer 588 may then be rotated in order to gain further information about the polarization states of the pupil plane 557. The collimated light filtered through the rotating polarizer 588 may then be focused by the seventh lens 592, and transmitted to the second sensor 596; any Koehler illumination that passes through lens 592 will not be focused by at the second sensor 596. Sensors 584, 596 may be for example CCD cameras, and may then transmit the signals received to a controller 597, which may contain a processing unit.

The light signal obtained at the first sensor 584 may be the interferometric signal from interference of s-polarized light at the first non-polarizing beam splitter 560, and the sixth lens 580 and may collect light from the sample 552 at the focal plane 558. Modulation of the interference signal received at the first sensor 584 may be obtained through scanning of the wavelength of the polarizing device 508. While a fraction of the interferometric signal received at the first sensor 584 may be due to the collimated beam, the contribution of the collimated beam may serve as a background signal in the interference fringes of the interferometric signal, reducing the interference fringe contrast, and may not interact with the Koehler illumination due to the different optical path designs of the beams 512, 516.

The light signal obtained at the second sensor 596 may be an ellipsometric signal of polarized light along a polarization axis of the rotating polarizer 588, with the seventh lens 592 collecting light from the pupil plane 557. The rotation of the rotating polarizer 588 may be able to sample all of the polarization state of the pupil plane 557, providing further ellipsometric data as compared to the optical systems 300, 400 of FIGS. 3-4, respectively. Modulation of the ellipsometric signal received at the second sensor 596 may be obtained through scanning of the wavelength of the polarizing device 508. The ellipsometric signal may measure a wavelength dependent ellipsometric phase, which is a phase difference between the p-polarized light and s-polarized light generated due to interaction of light with the sample 552. While a fraction of the ellipsometric signal received at the second sensor 596 may be due to Koehler illumination, it will not be focused at the second sensor 596 and thus may contribute to an out-of-focus background in the ellipsometric signal.

The interferometric and ellipsometric signals received at the first sensor 584 and the second sensor 596, respectively may then be analyzed with controller 597 and fit to a generalized model via regression to describe the optical response of the sample 552. The interferometric signal and the ellipsometric signal may be regressed on either sequentially or concurrently, and the regression process may take place concurrently with the measurements. Alternatively, the regression process may take place prior to the actual measurement and look up tables may be subsequently used to identify properties. A combination of look up tables and regression process can be used to ascertain the desired properties of sample 552.

FIG. 6 illustrates a fourth example embodiment of an optical system 600 for concurrent polarized, multi-wavelength microscopy and ellipsometry of a sample 652. The sample 652 may include a thin film, for example a multi-layer thin film deposited over lithographically patterned features. In the optical system 600, polarized optical signals may be obtained from imaging the sample 652 with Koehler illumination of a first polarization as a function of wavelength, while ellipsometric signals of a second polarization may be obtained from imaging a collimated light signal of a second polarization as a function of wavelength and angular position within a pupil plane 657.

Optical system 600 may include a light source 604 producing broadband light. Light source 604 for example may be a halogen lamp, which may produce a white light spectrum. Light from light source 604 may then pass through a polarizing device 608, which may generate two beams of orthogonal polarization. The polarizing device 608 may for example be an opto-acoustic polarizing device, or a spectrometer.

The two beams of orthogonal polarization may then travel through two separate optical arms of the optical system 600. The first beam 612 may reflect off of a first mirror 602, to pass through a first lens 628, producing a collimated or near collimated beam of light. The second beam 616 may reflect off of a second mirror 624, pass through a second lens 632, an aperture 636, and a third lens 640, where the lenses 632, 640 are of an appropriate design for generating Koehler illumination. The aperture 636 may be positioned between the lenses 632, 640 and in relation to a fourth lens 656 in order to maintain a proper distance from the back focal length of the fourth lens 656. Hence, the first beam 612 may be maintained as a collimated beam in a linearly polarized state, while the second beam 616 may be maintained as Koehler illumination in an orthogonal linearly polarized state.

The second beam 616 may then reflect off of a third mirror 448, and the beams 612, 616 may then be recombined and made coaxial at a polarizing beam splitter 644, with the first beam 612 transmitting through the polarizing beam splitter 644, while the second beam 616 may reflect off of the polarizing beam splitter 644.

The beams 612, 616, having been made coaxial at the polarizing beam splitter 644, may then be sent to an interferometric cell 649. The interferometric cell 649 in this embodiment is of a Linnik type, in which a measurement arm 655 includes a fourth lens 656, wherein the fourth lens 656 is maintained between a first non-polarizing beam splitter 660 and the sample 652, and a reference arm 665 includes a fifth lens 664, wherein the fifth lens 664 is maintained between the first non-polarizing beam splitter 660 and a flat mirror 668. The measurement arm 655 and the reference arm 665 may be configured to maintain the optimal optical path length in the absence of the sample 652, in order to allow for interference patterns to be generated at the first non-polarizing beam splitter 660. However, in contrast to the optical systems 300, 500 of FIGS. 3, 5 respectively, the optical system 600 may contain an optical chopper 663 in the reference arm 665, positioned in between the first non-polarizing beam splitter 660 and the fifth lens 664. The optical chopper 663 may spin at a fixed frequency, and may serve to periodically interrupt the beams 612, 616 in the measurement arm 655, serving to eliminate interference between light in the measurement arm 655 and light in the reference arm 665. The lenses 656, 664 may be objective lens, and may have a NA chosen to enhance the ellipsometric signal. Preferably, the fourth lens 656 of the measurement arm 655 and the fifth lens 664 of the reference arm 665 have common optical properties (e.g., matched NAs).

The interferometric cell 649 may be configured to receive beams 612, 616, which may then each reflect and transmit through a non-polarizing beam splitter 460. Each of the two beams 612, 616 may transmit through the first non-polarizing beam splitter 660 with first level of transmission through the reference arm 665, and may reflect off of the non-polarizing beam splitter 460 with a second level of reflection through the measurement arm 655. A 50/50 beam splitter may be chosen to balance the optical power between the two arms of the interferometer cell, however other combinations may be chosen to include characteristics of the sample In the reference arm 665, the beams 612, 616 may pass through the fifth lens 664, reflect off of a flat mirror 668, and return to the first non-polarizing beam splitter 660. The surface of the flat mirror 668 may characterized to be within a pre-calibrated tolerance for surface flatness. In the measurement arm, 655, the beams 612, 616 may transmit through the fourth lens 656, which focuses the collimated light of the first beam 612 to a spot onto the sample 652, and scatters and/or reflects from the sample 652. In one example, the size of the spot of the first beam 612 on the sample 652 may be at the diffraction limit of the fourth lens 656. The interaction of the beams 612, 616 with the sample 652 may cause change in the polarization of each of the first beam 612 and the second beam 616 from a pure linear polarization state with the amount of change being dependent on the optical properties of the sample 652. The beams 612, 616 in the reference arm 665 reflecting off the flat mirror 668 and the beams 612, 616 which scatter and/or reflect from the sample 652 in the measurement arm 655 may then recombine at the first non-polarizing beam splitter 660.

The beams 612, 616, having interfered at the first non-polarizing beam splitter 660, may then further transmit through the first non-polarizing beam splitter 660 and impinge upon a second non-polarizing beam splitter 672. Light may then be reflected by the second non-polarizing beam splitter 672 into a first detection arm 675, the first detection arm 675 including a sixth lens 680 and a first sensor 684. In contrast with the optical systems 300, 400 of FIGS. 3-4 respectively, the first detection arm 675 may optionally include a fixed polarizer 676 positioned in between the second non-polarizing beam splitter 672 and the sixth lens 680 in order to filter out a specific polarization state of light; the light passing through the fixed polarizer 676 may then include mostly Koehler illumination with a small fraction of the collimated beam. The Koehler illumination filtered through the fixed polarizer 676 may then be focused by the sixth lens 680 onto the first sensor 684. Light may also be transmitted through the second non-polarizing beam splitter 672 into a second detection arm 685, the second detection arm 685 including a seventh lens 692 and a second sensor 696. In contrast with the optical systems 300, 400 of FIGS. 3-4 respectively, the second detection arm 685 may include a rotating polarizer 688 positioned in between the second non-polarizing beam splitter 672 and the seventh lens 692. The rotating polarizer 688 may then be rotated in order to gain further information about the polarization state of the pupil plane 657. The light filtered through the rotating polarizer 688 may then be focused by the seventh lens 692 onto the second sensor 696. Sensors 684, 696 may be for example CCD cameras, and may then transmit the signals received to a controller 697, which may contain a processing unit.

Due to the removal of interference by introduction of the optical chopper 663, the first detection arm 675 may function as a multi-wavelength polarizing microscope for linearly polarized light, allowing imaging of the sample 652 at the first sensor 684 as a function wavelength. The sixth lens 680 may focus light obtained from the sample 652 at the focal plane 658. Modulation of the signal received at the first sensor 684 may be obtained through scanning of the wavelength polarizing device 608.

The light signal obtained at the second sensor 696 may be an ellipsometric signal of polarized light along a polarization axis of the rotating polarizer 688, with the seventh lens 692 focusing light from the pupil plane 657. The rotation of the polarizer 688 may enable sampling of all the polarizations in the pupil plane 657, providing further ellipsometric data as compared to the optical systems 300, 400 of FIGS. 3-4, respectively. Modulation of the ellipsometric signal received at the second sensor 696 may be obtained through scanning of the wavelength of the light polarizing device 608. The ellipsometric signal may measure a wavelength and angle dependent ellipsometric phase, generated due to interaction of light with the sample 652. While a fraction of the ellipsometric signal received at the second sensor 696 may be due to Koehler illumination and contribute to a background to the ellipsometric signal, collimated light, and not Koehler illumination, will be focused at the second sensor 696. Further, due to elimination of interference by the optical chopper 663, modelling of the ellipsometric signal may be simplified.

The optical and ellipsometric signals received at the first sensor 684 and the second sensor 696, respectively may then be analyzed with controller 697 and fit to a generalized model via regression to describe the optical response of the sample 652. The optical signal and the ellipsometric signal may be regressed on either sequentially or concurrently, and the regression process may take place concurrently with the measurements. Alternatively, the regression process may take place prior to the actual measurement and look up tables may be subsequently used to identify properties. A combination of look up tables and regression process can be used to ascertain the desired properties of sample 662. Further, imaging capabilities of the optical system 600 may be enhanced through comparing optical signals received in the detection arms 675, 685 in the presence of interference (when the optical chopper 663 is deactivated) versus optical signals received in the detection arms 675, 685 in the absence of interference (when the optical chopper 663 is activated).

In this way, both optical system 500 of FIG. 5 and optical system 600 of FIG. 6 may each provide examples of optical systems for imaging a sample via concurrently imaging polarization states of light in a pupil plane of an objective lens and light in a focal plane of the objective lens. Both optical system 500 of FIG. 5 and optical system 600 of FIG. 6 may each include a broadband light source configured to emit polarized light that is polarized to two orthogonal polarization states, a plurality of beam splitters configured to combine and split the polarization states, an interferometric cell including a reference arm and a measurement arm, the reference arm containing the objective lens and a sample to be imaged, a plurality of lenses configured to focus the polarized light at predefined locations, a first detection arm configured to detect light in the focal plane of the objective lens, and a second detection arm including a rotating analyzer configured to detect polarization states of light in the pupil plane of the objective lens. Whereas the optical system 300 of FIG. 3 and the optical system 400 of FIG. 4 are each configured to image interferometric signals of a first polarization and ellipsometric signals of a second, orthogonal polarization, with each of the first polarization and second polarization fixed, both optical system 500 of FIG. 5 and optical system 600 of FIG. 6 are configured to image the polarization states of the ellipsometric signal in the pupil plane as a function of angle, allowing for direct imaging of the polarization states of Koehler illumination in the pupil plane.

Figure 7:
FIG. 7 illustrates a flow chart of an example method for utilizing the system of FIG. 3 for measuring optical properties of a sample, according to the present disclosure.
Figure 7:
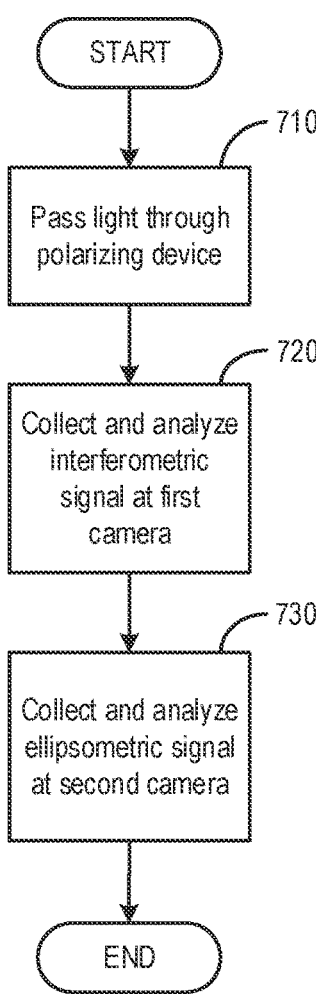

FIG. 7 shows a method 700 for obtaining concurrent interferometric and ellipsometric signals from the optical system 300 of FIG. 3. Method 700 will be described in reference to the system described herein and with regard to FIG. 3, but it should be understood that similar methods may be applied to other systems without departing from the scope of this disclosure. Method 700 may be carried out and may be stored at controller 397 in non-transitory memory. Instructions for carrying out method 700 may be executed by the controller 397 in conjunction with signals received from sensors of the optical system, such as the sensors described above with reference to FIG. 3. The controller may employ actuators of the optical system to adjust operation of the optical system, according to the methods described below.

At 710, method 700 may pass light from a light source (such as light source 304 of FIG. 3) through a light polarizing device (such as polarizing device 308 of FIG. 3). The polarizing device may generate two cross-polarized beams. In one example the cross-polarized beams may include a first beam (such as first beam 312 of FIG. 3) with linearly polarized light (such as sample 352 of FIG. 3), and a second beam (such as second beam 316 of FIG. 3) of linearly polarized light orthogonal to the first beam.

At 720, method 700 may collect and analyze interferometric signals received at a first sensor (such as first sensor 380 of FIG. 3). The first and second beams may pass through the optical system as described in relation to FIG. 3, and may generate an interferometric signal to be received at the first sensor. The signal received at the first sensor may undergo A/D conversion via a processor (such as a processor of controller 397 of FIG. 3). The processor may then regress on a post-processed signal, in order to fit the interferometric signal to a generalized model in order to generate data of the thickness of the sample. The regression may be done either concurrently with the measurement of the signal at the first sensor, regressing over wavelength. Alternatively, the regression may be done prior to the measurement, and the post-processed signal may compared to a look up table of values stored in the non-transitory memory of the processor in order to obtain data of the thickness of the sample. In one example, the signal received from the first sensor may be time averaged over an exposure time. In another example, the signal received from the first sensor may be updated in real time, generating a separate data set for each sampling period of the first sensor.

At 730, method 700 may collect and analyze ellipsometric signals received at a second sensor (such as second sensor 388 of FIG. 3). The first and second beams may pass through the optical system as described in relation to FIG. 3, and may generate an ellipsometric signal to be received at the second sensor. The signal received at the second sensor may undergo A/D conversion via the processor. The processor may then regress on a post-processed signal, in order to fit the ellipsometric signal to a generalized model in order to generate data of the topography of the sample. The regression may be done either concurrently with the measurement of the signal at the second sensor, regressing over the angle and wavelength. Alternatively, the regression may be done prior to the measurement, and the post-processed signal may compared to a look up table of values stored in the non-transitory memory of the processor in order to obtain data of the topography of the sample. In one example, the signal received from the second sensor may be time averaged over an exposure time. In another example, the signal received from the second sensor may be updated in real time, generating a separate data set for each sampling period of the first sensor. Following 730, method 700 may then end.

Figure 8:
FIG. 8 illustrates a flow chart of an example method for utilizing the system of FIG. 4 for measuring optical properties of the sample, according to the present disclosure.
Figure 8:
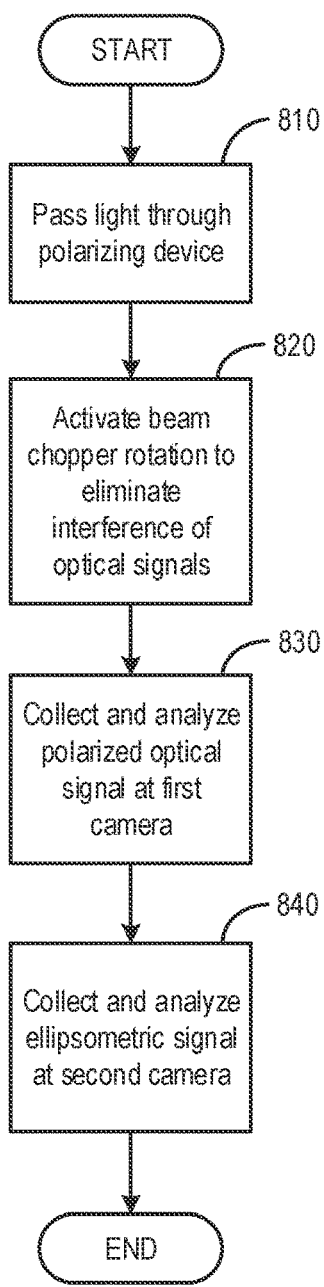

FIG. 8 shows a method 800 for obtaining concurrent interferometric and ellipsometric signals from the optical system 400 of FIG. 4. Method 800 will be described in reference to the system described herein and with regard to FIG. 4, but it should be understood that similar methods may be applied to other systems without departing from the scope of this disclosure. Method 800 may be carried out and may be stored at controller 497 in non-transitory memory. Instructions for carrying out method 800 may be executed by the controller 497 in conjunction with signals received from sensors of the optical system, such as the sensors described above with reference to FIG. 4. The controller may employ actuators of the optical system to adjust operation of the optical system, according to the methods described below.

At 810, method 800 may pass light from a light source (such as light source 404 of FIG. 4) through a light polarizing device (such as polarizing device 408 of FIG. 4). The polarizing device may generate two cross-polarized beams. In one example, the cross-polarized beams may include a first beam (such as first beam 412 of FIG. 4) with linearly polarized light (such as sample 452 of FIG. 4), and a second beam (such as second beam 416 of FIG. 4) with linear polarization orthogonal to the first beam.

At 820, method 800 may activate an optical chopper (such as optical chopper 463 of FIG. 4) in order to eliminate the interference of optical signals from the optical system. The optical chopper may serve to eliminate interference in the signals received at a first sensor (such as first sensor 480 of FIG. 4) and a second sensor (such as second sensor 488 of FIG. 4) of the optical system, effectively turning the signal received at the first sensor into a polarized optical microscopic signal of the sample.

At 830, method 800 may collect and analyze polarized optical signals received at a first sensor (such as first sensor 480 of FIG. 4). The first and second beams may pass through the optical system as described in relation to FIG. 4, and may generate a polarized optical signal to be received at the first sensor. The signal received at the first sensor may undergo A/D conversion via a processor (such as processor of controller 497 of FIG. 4), and may provide polarized optical microscopy data of the sample as a function of wavelength. In one example, the signal received from the first sensor may be time averaged over an exposure time. In another example, the signal received from the first sensor may be updated in real time, generating a separate data set for each sampling period of the first sensor.

At 840, method 800 may collect and analyze ellipsometric signals received at a second sensor (such as second sensor 488 of FIG. 4). The first and second beams may pass through the optical system as described in relation to FIG. 4, and may generate an ellipsometric signal to be received at the second sensor. The signal received at the second sensor may undergo A/D conversion via the processor. The processor may then regress on a post-processed signal, in order to fit the ellipsometric signal to a generalized model in order to generate data of the topography of the sample. Due to the lack of interference in the signal received at the second sensor, the model may be simplified. The regression may be done either concurrently with the measurement of the signal at the second sensor, regressing over the angle and wavelength. Alternatively, the regression may be done prior to the measurement, and the post-processed signal may compared to a look up table of values stored in the non-transitory memory of the processor in order to obtain data of the topography of the sample. In one example, the signal received from the second sensor may be time averaged over an exposure time. In another example, the signal received from the second sensor may be updated in real time, generating a separate data set for each sampling period of the first sensor. Following 840, method 800 may then end.

In this way, each of method 700 of FIG. 7 and method 800 of FIG. 8 may provide methods for optical systems (such as optical system 300 of FIG. 3 and optical system 400 of FIG. 4, respectively), whereby each of the optical systems may shine light via a broadband light source to be polarized into two beams of polarized light of orthogonal polarizations, combine and split the orthogonal polarizations via a plurality of beam splitters, interfere light from the two beams via an interferometric cell, including a reference arm and a measurement arm, the measurement arm containing an objective lens and a sample to be imaged, focus the polarized light via a plurality of lenses at predefined locations, receive a first set of light detection signals from a first sensor in a first detection arm and a second set of light detection signals from a second sensor in a second detection arm via a processor, and allow for different data analysis modes to be used on the first set of light detection signals and the second set of light detection signals received at the processor via a data acquisition system of the processor. In contrast with the optical system 300 of FIG. 3, the optical system 400 of FIG. 4 may include an optical chopper in the reference arm of an interferometric cell, which may modulate light signals in the reference arm.

The data analysis modes may include a first mode employed in method 800 of FIG. 8, in which the optical chopper may rotate at a constant frequency, the processor may receive the first set of light detection signals from the first sensor as optical microscope signals of a first polarization, and the processor may receive the second set of light detection signals from the second sensor as ellipsometric signals without interference of a second polarization. The second mode employed in method 700 of FIG. 7 may not include modulation of light in the reference arm by an optical chopper, in which the processor may receive the first set of light detection signals from the first sensor as interferometric signals of the first polarization, and the second set of light detection signals from the second sensor as ellipsometric signals of the second polarization.

Figure 9:
FIG. 9 illustrates a flow chart of an example method for utilizing the system of FIG. 5 for measuring optical properties of the sample, according to the present disclosure.
Figure 9:
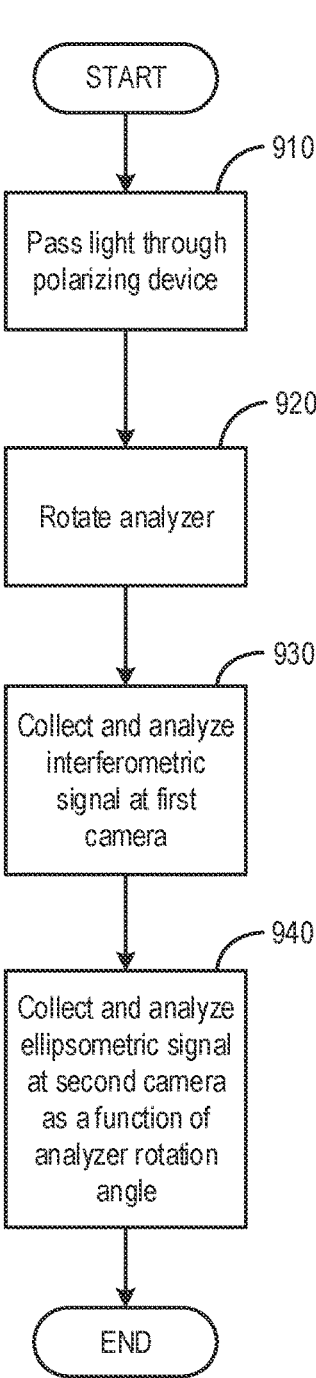

FIG. 9 shows a method 900 for obtaining concurrent interferometric and ellipsometric signals from the optical system of FIG. 5. Method 900 will be described in reference to the system described herein and with regard to FIG. 5, but it should be understood that similar methods may be applied to other systems without departing from the scope of this disclosure. Method 900 may be carried out and may be stored at controller 597 in non-transitory memory. Instructions for carrying out method 900 may be executed by the controller 597 in conjunction with signals received from sensors of the optical system, such as the sensors described above with reference to FIG. 9. The controller may employ actuators of the optical system to adjust operation of the optical system, according to the methods described below.

At 910, method 900 may pass light from a light source (such as light source 504 of FIG. 5) through a light polarizing device (such as polarizing device 508 of FIG. 5). The polarizing device may generate two cross-polarized beams. In one example, the cross-polarized beams may include a first beam (such as first beam 512 of FIG. 5) with linearly polarized light (such as sample 552 of FIG. 5), and a second beam (such as second beam 516 of FIG. 5) with linearly polarized light orthogonal to the first beam.

At 920, method 900 may rotate an analyzer (such as rotating polarizer 588 of FIG. 5). In one example, the rotating analyzer may be rotated at a fixed frequency via the controller. In another example, the rotating analyzer may be adjusted either manually or via the controller to be fixed at discrete polarization angles.

At 930, method 900 may collect and analyze interferometric signals received at a first sensor (such as first sensor 584 of FIG. 5). The first and second beams may pass through the optical system as described in relation to FIG. 5, and may generate an interferometric signal to be received at the first sensor. The signal received at the first sensor may undergo A/D conversion via a processor (such as a processor of controller 597 of FIG. 5). The processor may then regress on a post-processed signal, in order to fit the interferometric signal to a generalized model in order to generate data of the thickness of the sample. The regression may be done either concurrently with the measurement of the signal at the first sensor, regressing over the angle and wavelength. Alternatively, the regression may be done prior to the measurement, and the post-processed signal may compared to a look up table of values stored in the non-transitory memory of the processor in order to obtain data of the thickness of the sample. In one example, the signal received from the first sensor may be time averaged over an exposure time. In another example, the signal received from the first sensor may be updated in real time, generating a separate data set for each sampling period of the first sensor.

At 940, method 900 may collect and analyze ellipsometric signals received at a second sensor (such as second sensor 596 of FIG. 5) as a function of a rotation angle of the rotating analyzer. The first and second beams may pass through the optical system as described in relation to FIG. 5, and may generate an ellipsometric signal to be received at the second sensor. The signal received at the second sensor may undergo A/D conversion via the processor. The processor may then regress on a post-processed signal, in order to fit the ellipsometric signal to a generalized model in order to generate data of the topography of the sample. The regression may be done either concurrently with the measurement of the signal at the second sensor, regressing over the angle, the angle of orientation of the rotating polarizer, and the wavelength. Alternatively, the regression may be done prior to the measurement, and the post-processed signal may compared to a look up table of values stored in the non-transitory memory of the processor in order to obtain data of the topography of the sample. In one example, the signal received from the second sensor may be time averaged over an exposure time. This may be done for example if the rotating analyzer is placed at discrete angles. In another example, the signal received from the second sensor may be updated in real time, generating a separate data set for each sampling period of the first sensor. This may be done for example if the rotating analyzer is rotated at a constant frequency. Following 940, method 900 may then end.

Figure 10:
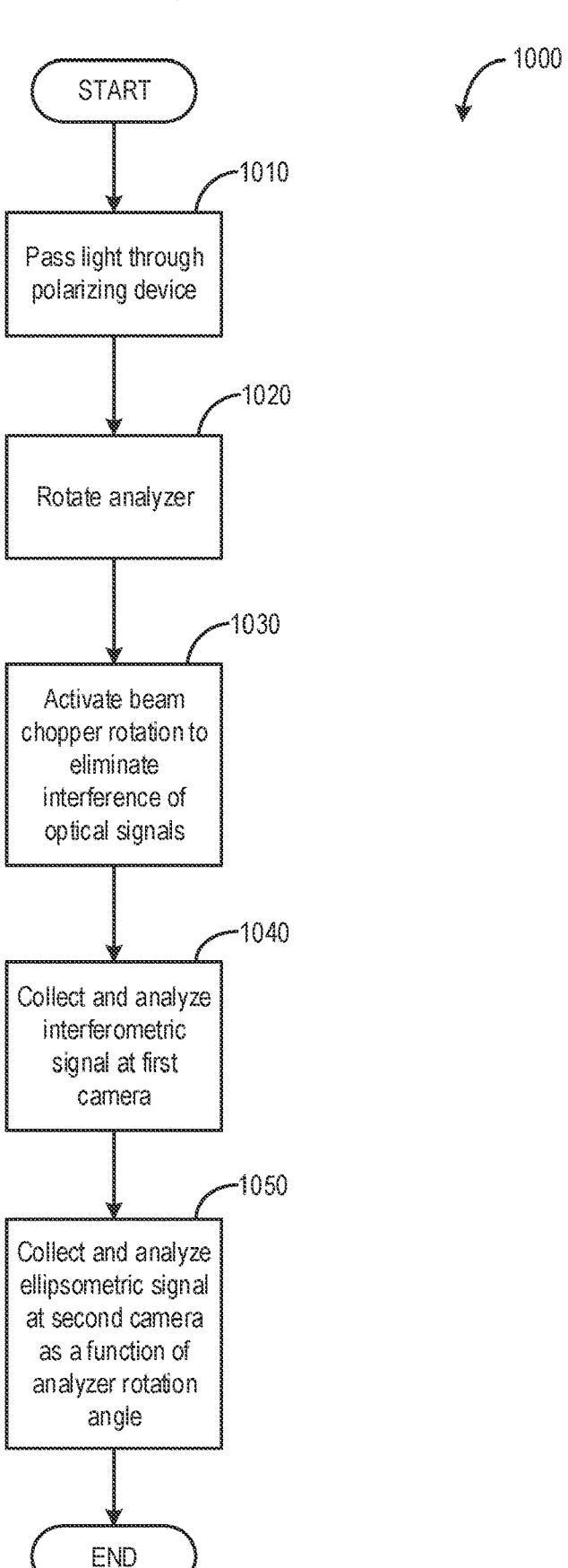
FIG. 10 illustrates a flow chart of an example method for utilizing the system of FIG. 6 for measuring optical properties of the sample, according to the present disclosure.

FIG. 10 shows a method 1000 for obtaining concurrent interferometric and ellipsometric signals from the optical system of FIG. 6. Method 1000 will be described in reference to the system described herein and with regard to FIG. 6, but it should be understood that similar methods may be applied to other systems without departing from the scope of this disclosure. Method 1000 may be carried out and may be stored at controller 697 in non-transitory memory. Instructions for carrying out method 1000 may be executed by the controller 697 in conjunction with signals received from sensors of the optical system, such as the sensors described above with reference to FIG. 10. The controller may employ actuators of the optical system to adjust operation of the optical system, according to the methods described below.

At 1010, method 1000 may pass light from a light source (such as light source 604 of FIG. 6) through a polarizing device (such as polarizing device 608 of FIG. 6). In one example, the cross-polarized beams may include a first beam (such as first beam 612 of FIG. 6) of linearly polarized light (such as sample 652 of FIG. 6), and a second beam (such as second beam 616 of FIG. 6) with of linearly polarized light orthogonal to the first beam.

At 1020, method 1000 may rotate a rotating analyzer (such as rotating polarizer 688 of FIG. 6). In one example, the rotating analyzer may be rotated at a fixed frequency via the controller. In another example, the rotating analyzer may be adjusted either manually or via the controller to be fixed at discrete polarization angles.

At 1030, method 1000 may activate an optical chopper (such as optical chopper 663 of FIG. 6) in order to eliminate interference of optical signals in the optical system. The optical chopper may serve to eliminate interference in the signals received at a first sensor (such as first sensor 684 of FIG. 6) and a second sensor (such as second sensor 696 of FIG. 6) of the optical system, effectively turning the signal received at the first sensor into a polarized optical microscopic signal of the sample.

At 1040, method 1000 may collect and analyze interferometric signals received at a first sensor (such as first sensor 684 of FIG. 6). The first and second beams may pass through the optical system as described in relation to FIG. 6, and may generate a polarized optical signal to be received at the first sensor. The signal received at the first sensor may undergo A/D conversion via a processor (such as processor of controller 697 of FIG. 6), and may provide optically polarized data of the sample as a function of wavelength. In one example, the signal received from the first sensor may be time averaged over an exposure time. In another example, the signal received from the first sensor may be updated in real time, generating a separate data set for each sampling period of the first sensor.

At 1050, method 1000 may collect and analyze ellipsometric signals received at a second sensor (such as second sensor 696 of FIG. 6) as a function of a rotation angle of the rotating analyzer. The first and second beams may pass through the optical system as described in relation to FIG. 6, and may generate an ellipsometric signal to be received at the second sensor. The signal received at the second sensor may undergo A/D conversion via the processor. The processor may then regress on a post-processed signal, in order to fit the ellipsometric signal to a generalized model in order to generate data of the topography of the sample. Due to the lack of interference in the signal received at the second sensor, the model may be simplified. The regression may be done either concurrently with the measurement of the signal at the second sensor, regressing over the angle, the angle of orientation of the rotating polarizer, and the wavelength. Alternatively, the regression may be done prior to the measurement, and the post-processed signal may compared to a look up table of values stored in the non-transitory memory of the processor in order to obtain data of the topography of the sample. In one example, the signal received from the second sensor may be time averaged over an exposure time. This may be done for example if the rotating analyzer is placed at discrete angles. In another example, the signal received from the second sensor may be updated in real time, generating a separate data set for each sampling period of the first sensor. This may be done for example if the rotating analyzer is rotated at a constant frequency. Following 1050, method 1000 may then end.

In this way, the optical systems of FIGS. 3-6 may be utilized to obtain concurrent interferometric and ellipsometric information of a sample. The technical effect of measuring interferometric and ellipsometric signals of a sample concurrently is to obtain film thickness and topography properties of the sample concurrently without mechanically moving the sample and/or adding/removing components from the optical system. Said another way, the film thickness and topography properties of the sample may be obtained through concurrent interferometric and ellipsometric measurements while maintaining the sample in a stationary position, and/or without addition or removing components from the optical system. The optical systems of FIGS. 4-6 may include additional features for more imaging capabilities. For example, the addition of an optical chopper in the optical systems of FIGS. 4, 6 may allow for user-controlled application/removal of interference in the received signals, allowing for comparison of non-interfering and interfering signals for further characterization of the sample. Additionally, the optical systems of FIGS. 5-6 may include a rotating polarizer, allowing for further characterization of the polarization states of light in the pupil plane. By enabling concurrent ellipsometric and interferometric capabilities within a single optical system, optical characterization of a sample may be simplified via fitting to a generalized model for ellipsometry and interferometry with fewer floating parameters. Concurrent ellipsometric and interferometric capabilities within a single optical system may also allow for more efficient characterization of optical properties of a sample by reducing the time spent during optical characterization of a sample.

The disclosure provides support for an optical system for concurrent interferometry and ellipsometry, comprising: a broadband light source configured to emit polarized light that is polarized to two orthogonal polarization states, a plurality of beam splitters configured to combine and split the polarized light that is polarized to the two orthogonal polarization states, an interferometric cell configured to create interference patterns from the polarized light with respect to a surface of a sample, a plurality of lenses configured to focus the polarized light at predefined locations, and a plurality of detectors configured to analyze the polarized light as a function of angle and wavelength. In a first example of the system, the broadband light source is configured to transmit light to be polarized by an optoacoustic device or a polarizing beam splitter and a spectrometer to produce a first beam of a first polarization and a second beam of a second polarization that is orthogonal to the first polarization. In a second example of the system, optionally including the first example, the plurality of lenses include a first lens, a second lens, and a third lens, wherein the first beam is reflected off of a first mirror and transmitted through a first lens which collimates the first beam, and wherein the second beam is reflected off of a second mirror, transmitted through a second lens, passed through an aperture, and transmitted through a third lens, where a design of the second lens and the third lens and a positioning of the aperture are appropriate for producing Koehler illumination from the second beam. In a third example of the system, optionally including one or both of the first and second examples, the system further comprises: a first polarizing beam splitter, wherein after being transmitted through the first lens, the collimated first beam is transmitted through the first polarizing beam splitter, thereby becoming coaxial with the Koehler illumination produced from the second beam that is reflected by the first polarizing beam splitter. In a fourth example of the system, optionally including one or more or each of the first through third examples, the interferometric cell is configured to receive incident light from the first beam and the second beam, and includes each of a first polarizing beam splitter, a measurement arm including a fourth lens of the plurality of lenses and the sample, wherein the fourth lens is positioned between the polarizing beam splitter and the sample, and a reference arm including a fifth lens of the plurality of lenses and a third mirror, wherein the fifth lens is positioned between the polarizing beam splitter and the third mirror. In a fifth example of the system, optionally including one or more or each of the first through fourth examples, the interferometric cell is configured to pass each of the first beam and the second beam through a non-polarizing beam splitter with a first level of transmission through the reference arm, and a second level of reflection through the measurement arm, and wherein incident light from each of the reference arm and the measurement arm is recombined and interferes at the non-polarizing beam splitter. In a sixth example of the system, optionally including one or more or each of the first through fifth examples, the fourth lens focuses incident light from the non-polarizing beam splitter of the first beam down to a first spot of collimated light onto the surface of the sample, and wherein the fourth lens renders diverging light from the non-polarizing beam splitter of the second beam to a second spot of uniform Koehler illumination onto the surface of the sample, a size of the second spot being greater than a size of the first spot. In a seventh example of the system, optionally including one or more or each of the first through sixth examples, the system further comprises: a second polarizing beam splitter configured to receive interfered light of the first beam and the second beam emanating from the non-polarizing beam splitter, a first detection arm comprising a sixth lens of the plurality of lenses and a first detector, and a second detection arm comprising a seventh lens of the plurality of lenses and a second detector, with the first detector and the second detector in communication with a processor. In an eighth example of the system, optionally including one or more or each of the first through seventh examples, the first detection arm is configured to receive the interfered light of the second polarization via the sixth lens focusing light onto the first detector, and the second detection arm is configured to receive the interfered light of the first polarization via the seventh lens focusing light onto the second detector. The disclosure also provides support for an optical system for imaging a sample via concurrently imaging polarization states of light in a pupil plane of an objective lens and light in a focal plane of the objective lens, the optical system comprising: a broadband light source configured to emit polarized light that is polarized to two orthogonal polarization states, a plurality of beam splitters configured to combine and split the polarization states, an interferometric cell including a reference arm and a measurement arm, the reference arm containing the objective lens and the sample to be imaged, a plurality of lenses configured to focus the polarized light at predefined locations, a first detection arm configured to detect light in the focal plane of the objective lens, and a second detection arm including a rotating analyzer configured to detect polarization states of light in the pupil plane of the objective lens. In a first example of the system, the plurality of lenses comprises a first lens configured to produce a collimated beam of light, a second lens and a third lens configured to produce Koehler illumination, a fourth lens in the measurement arm which is the objective lens, a fifth lens in the reference arm, a sixth lens in the first detection arm, and a seventh lens in the second detection arm. In a second example of the system, optionally including the first example, the system further comprises: the first detection arm comprising a fixed polarizer and the sixth lens, the sixth lens configured to resolve Koehler illumination of a first polarization to be detected at a first detector, and the second detection arm comprising the rotating analyzer and a seventh lens, the seventh lens configured to resolve collimated light of a polarization aligned with a polarization axis of the rotating analyzer to be detected at a second detector. In a third example of the system, optionally including one or both of the first and second examples, the rotating analyzer is configured to operate in a first condition and a second condition, whereby in the first condition the rotating analyzer transmits light from the pupil plane along an axis aligned with one or more discrete positions of the polarization axis, and in the second condition the rotating analyzer images light from the pupil plane by rotating the polarization axis at a constant frequency. In a fourth example of the system, optionally including one or more or each of the first through third examples, a signal of collimated light of a polarization aligned with a polarization axis of the rotating analyzer detected at the second detector is analyzed as a function of angle without a model of the polarization states of the pupil plane.

The disclosure also provides support for a method for an optical system, comprising: transmitting light from a broadband light source to be polarized into two beams of polarized light of orthogonal polarizations, combining and splitting the orthogonal polarizations via a plurality of beam splitters, interfering light from each of the two beams at an interferometric cell via a reference arm and a measurement arm, the measurement arm containing an objective lens and a sample to be imaged, focusing polarized light via a plurality of lenses at predefined locations, modulating light signals in the reference arm via an optical chopper in the reference arm of the interferometric cell of the optical system, receiving a first set of light detection signals from a first sensor in a first detection arm and a second set of light detection signals from a second sensor in a second detection arm at a processor, and allowing for different data analysis modes to be used on the first set of light detection signals and the second set of light detection signals received via the processor including a data acquisition system. In a first example of the method, the data analysis modes include a first mode in which the optical chopper rotates at a constant frequency, the processor receives the first set of light detection signals from the first sensor as optical microscope signals of a first polarization, and the processor receives the second set of light detection signals from the second sensor as ellipsometric signals without interference of a second polarization, and a second mode in which the optical chopper is in an off state, the processor receives the first set of light detection signals from the first sensor as interferometric signals of the first polarization, and the processor receives the second set of light detection signals from the second sensor as ellipsometric signals of the second polarization. In a second example of the method, optionally including the first example, rotation of the optical chopper is synchronized with the data acquisition system of the processor. In a third example of the method, optionally including one or both of the first and second examples, in the first mode, the data acquisition system of the processor is configured to regress on the interferometric signals of the first polarization and the ellipsometric signals of the second polarization jointly, either sequentially or concurrently. In a fourth example of the method, optionally including one or more or each of the first through third examples, the regression on the interferometric signals of the first polarization and the ellipsometric signals of the second polarization is fit to a generalized model to describe film thickness and topography of the sample. In a fifth example of the method, optionally including one or more or each of the first through fourth examples, the first set of light detection signals are compared under the first mode and the second mode, and the second set of light detection signals are compared under the first mode and the second mode.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

The invention claimed is:

1. An optical system, comprising:

a broadband light source configured to emit broadband light;

a polarizing device configured to receive the broadband light and generate a first beam of a first polarization and a second beam of a second polarization that is orthogonal to the first polarization;

a polarizing beam splitter configured to combine and make coaxial the first and second beams;

an interferometric cell configured to receive light from the first beam and second beam;

a non-polarizing beam splitter of the interferometric cell configured to reflect and transmit the first and second beams and generate interference patterns due to the presence of a sample;

a first lens, positioned between the polarizing device and the polarizing beam splitter;

a second lens, positioned between the polarizing device and the polarizing beam splitter;

a third lens, positioned between the second lens and the polarizing beam splitter;

a fourth lens, positioned between the non-polarizing beam splitter and the sample;

a fifth lens, positioned between the non-polarizing beam splitter and a flat mirror;

a first mirror positioned between the polarizing device and the first lens;

a second mirror positioned between the polarizing device and the second lens, wherein the first beam is reflected off of the first mirror and transmitted through the first lens which collimates the first beam, and wherein the second beam is reflected off of the second mirror, transmitted through the second lens, passed through an aperture, and transmitted through the third lens, where a design of the second lens and the third lens and a positioning of the aperture are appropriate for producing Koehler illumination from the second beam.

2. An optical system, comprising:

a broadband light source configured to emit broadband light;

a polarizing device configured to receive the broadband light and generate a first beam of a first polarization and a second beam of a second polarization that is orthogonal to the first polarization;

an interferometric cell configured to receive incident light from the first beam and the second beam, and includes a polarizing beam splitter configured to combine and make coaxial the first beam and the second beam;

a non-polarizing beam splitter of the interferometric cell configured to reflect and transmit the first and second beams and generate interference patterns due to the presence of a sample;

a first lens, positioned between the polarizing device and the polarizing beam splitter;

a second lens, positioned between the polarizing device and the polarizing beam splitter;

a third lens, positioned between the second lens and the polarizing beam splitter;

a fourth lens, positioned between the non-polarizing beam splitter and the sample;

a fifth lens, positioned between the non-polarizing beam splitter and a flat mirror;

a first mirror positioned between the polarizing device and the first lens;

a second mirror positioned between the polarizing device and the second lens.

3. The optical system of claim 2, wherein the interferometric cell is configured to pass each of the first beam and the second beam through the non-polarizing beam splitter with a first level of transmission through a reference arm that includes the fifth lens and the flat mirror, and a second level of reflection through a measurement arm that includes the fourth lens and the sample, and wherein incident light from each of the reference arm and the measurement arm is recombined and interferes at the non-polarizing beam splitter.

4. The optical system of claim 3, wherein the fourth lens focuses incident light from the non-polarizing beam splitter of the first beam down to a first spot of collimated light onto the surface of the sample, and wherein the fourth lens renders diverging light from the non-polarizing beam splitter of the second beam to a second spot of uniform Koehler illumination onto the surface of the sample, a size of the second spot being greater than a size of the first spot.

5. The optical system of claim 3, further comprising a second polarizing beam splitter configured to receive interfered light of the first beam and the second beam emanating from the non-polarizing beam splitter, a first detection arm comprising a sixth lens and a first detector, and a second detection arm comprising a seventh lens and a second detector, with the first detector and the second detector in communication with a processor.

6. The optical system of claim 5, wherein the first detection arm is configured to receive interfered light of the second polarization via the sixth lens focusing light onto the first detector, and the second detection arm is configured to receive interfered light of the first polarization via the seventh lens focusing light onto the second detector.

7. The optical system of claim 5, wherein the first detection arm further comprises a fixed polarizer and the sixth lens is configured to resolve Koehler illumination of a first polarization to be detected at the first detector, and the second detection arm further comprises a rotating analyzer and a seventh lens, and the seventh lens is configured to resolve collimated light of a polarization aligned with a polarization axis of the rotating analyzer to be detected at the second detector.

8. The optical system of claim 7, wherein the rotating analyzer is configured to operate in a first condition and a second condition, whereby in the first condition the rotating analyzer transmits light from the pupil plane along an axis aligned with one or more discrete positions of the polarization axis, and in the second condition the rotating analyzer images light from the pupil plane by rotating the polarization axis at a constant frequency.

9. The optical system of claim 7, wherein a signal of collimated light of a polarization aligned with a polarization axis of the rotating analyzer detected at the second detector is analyzed as a function of angle without a model of the polarization states of the pupil plane.

* * * * *